US007287309B2

(12) United States Patent
Brazil

(10) Patent No.: US 7,287,309 B2
(45) Date of Patent: Oct. 30, 2007

(54) HEAVY DUTY CLUTCH INSTALLATION AND REMOVAL TOOL

(76) Inventor: Lawrence J. Brazil, Elele St., Unit #83, Kapolei, HI (US) 96707

( * ) Notice: Subject to any disclaimer, the term of this patent is extended or adjusted under 35 U.S.C. 154(b) by 114 days.

(21) Appl. No.: 11/140,444

(22) Filed: May 27, 2005

(65) Prior Publication Data

US 2006/0265848 A1 Nov. 30, 2006

(51) Int. Cl.
*B25B 27/14* (2006.01)
*B60P 1/48* (2006.01)

(52) U.S. Cl. ....................... 29/274; 29/281.1; 29/281.4

(58) Field of Classification Search .................. 29/271, 29/274, 281.1, 281.4, 281.6
See application file for complete search history.

(56) References Cited

U.S. PATENT DOCUMENTS 4,223,574 A 9/1980 Wickett
4,944,641 A 7/1990 Alves
5,033,717 A * 7/1991 Symon ....................... 254/8 B
5,190,265 A * 3/1993 Barry et al. ................ 254/8 B
5,251,875 A * 10/1993 Craychee et al. ........... 254/8 B
5,323,524 A 6/1994 Stilwell
6,584,663 B1 * 7/2003 Woodard et al. .............. 29/281
6,763,562 B2 * 7/2004 Barrios et al. ................ 29/274
2004/0084916 A1 * 5/2004 Cronk ....................... 294/67.1

* cited by examiner

*Primary Examiner*—David B Thomas
(74) *Attorney, Agent, or Firm*—Galasso & Associates LP; Raymond M. Galasso

(57) ABSTRACT

A tool is provided for the safe, efficient installation and removal of clutch assemblies and other engine components on heavy trucks or other machines. A mounting bracket is bolted to the flywheel housing to hold the tool in place and provide support for lifting. Mounting brackets in different sizes may be used for flywheel housings of different sizes. A clutch assembly may then be placed over a removable splined clutch shaft in the correct size for that clutch assembly. An input shaft may be slid manually back and forth through a position rail to provide horizontal motion for moving the clutch assembly toward or away from the flywheel housing. A slack adjuster provides precise rotational movement about the axis of the input shaft for raising or lowering the clutch assembly to the correct height. A lift extender provides additional motion for moving the clutch assembly into or out of position.

13 Claims, 2 Drawing Sheets

HEAVY DUTY CLUTCH INSTALLATION AND REMOVAL TOOL

FIELD OF THE DISCLOSURE

The present invention relates to installation tools, and more particularly, to tools used to install clutch assemblies and other engine components into trucks.

BACKGROUND

Motor vehicles are used to transport raw materials and manufactured goods from one point to another. Heavy-duty vehicles such as trucks are employed in moving these items along interstate highways and through urban and city streets. Commuters utilize automobiles, pick up trucks, and buses in traveling to and from work. Errands are completed as the family van or automobile carries family members to church, school, recreational activities, and to shopping centers. Without safe, dependable motor vehicles, life in most of the world's economically strong and dynamic countries would be dramatically different.

One aspect that all motor vehicles have in common is that they all need some type of engine to make them perform, powered by diesel, gas or the new breed of hybrid-powered vehicles. The stress placed on running an engine causes wear and tear on its working parts. Eventually the engine will break down and will be in need of repair. The repair may be from as simple as a needed tune-up, to as complicated as completely rebuilding the entire engine.

One component of a vehicle that often needs repair or replacing is the clutch assembly. Removing or repairing this component is difficult and often takes a great deal of time and energy. A clutch assembly on a heavy truck or other large vehicle or machine, for example, may comprise multiple parts, such as a pressure plate, connecting studs, a diaphragm spring, a through-out bearing, and a clutch housing, and may weigh over one hundred and fifty pounds. The size and weight of such a clutch assembly makes it awkward, strenuous, and potentially dangerous to lift into place. Therefore tools have been created to assist with the installation of such a clutch assembly, as well as for other engine components such as flywheels.

A common tool for such a clutch assembly for a heavy truck is a clutch installation jack on wheels and with a projecting spline. A mechanic places the spline through the central hole in the clutch assembly, uses the jack to raise the clutch assembly off the ground, and then rolls the jack into the proper position under the truck for installation of the clutch assembly.

However, the use of a clutch installation jack has a number of disadvantages that make it relatively inefficient and expensive. It requires that the truck requiring the clutch be raised off the ground, through additional, expensive tools such as a hydraulic lift or an additional jack, high enough to allow the clutch installation jack to be rolled into the proper position. The mechanic must manually push the heavy clutch assembly and the clutch installation jack into exactly the proper position for installation, which is awkward and sometimes difficult to accomplish. Installing a clutch assembly with a clutch installation jack typically takes forty-five minutes or more, which is an unnecessarily long and therefore expensive amount of time for the job. Furthermore, a typical clutch installation jack costs about a thousand dollars, making it prohibitively expensive for many mechanics. As a result, many mechanics choose not to buy a clutch installation jack and instead lift the clutch assembly into place, which may save them time and money for extra tools but may cause the serious injuries.

Other tools have also been design to aid in clutch installation. For example, U.S. Pat. No. 6,584,663 for Woodward provides the following tool:

"A clutch installation apparatus for raising heavy clutch components facilitates mounting of the components to a bell housing. The clutch installation apparatus includes a mounting plate that is removably mountable to a bell housing. The plate has a pair of slots extending therethrough. Fastening members are utilized to secure the plate to the bell housing. A pair of posts is fixedly coupled to the front surface of the plate. A pair of spools is rotatably coupled to the front surface of the plate. A strap extends between and is fixedly coupled to the spools. The strap is removably wound about the spools. A pair of couplers removably couples the strap to the clutch component. A pair of guide pins is releasably extendable through apertures in the bell housing. A ratcheting means selectively prevents rotation in a first direction and allows rotation in a second direction."

This tool removes the need for a clutch assembly jack and uses the bell housing of the vehicle's engine as a source of support for lifting clutch assemblies. However, hoisting a clutch assembly, which may weigh over one hundred pounds, into position by means of this tool's strap is awkward, imprecise, and potentially dangerous.

Therefore, there is a need for a tool for installing clutch assemblies and other engine components on heavy trucks or other large machines that is easier and more efficient to use and less expensive.

SUMMARY OF THE DISCLOSURE

The following explanation describes the present invention by way of example and not by way of limitation.

It is an aspect of the present invention to provide an apparatus that makes it easier to install a clutch assembly and other engine components into a truck or other machine without need of using additional tools to lift the vehicle.

It is an aspect of the present invention to provide an apparatus that quickly and precisely guides a clutch assembly and other engine components into proper position for installation, through efficient mechanical controls and without requiring manual lifting.

It is an aspect of the present invention to provide an apparatus for installing a clutch assembly and other engine components designed so that it is less expensive than prior techniques.

In accordance with the present invention, a clutch tool is provided for the safe, easy, and efficient installation and removal of clutch assemblies and other engine components on heavy trucks or other machines. A mounting bracket is bolted to the flywheel housing of the truck to hold the tool in place and provide support for lifting. Mounting brackets in different sizes may be used for flywheel housings of different sizes. A clutch assembly may then be placed over a removable splined clutch shaft in the correct size for that clutch assembly. An input shaft may be slid manually back and forth through a position rail to provide horizontal motion for moving the clutch assembly toward or away from the flywheel housing. A slack adjuster provides precise rotational movement about the axis of the input shaft for raising or lowering the clutch assembly to the correct height. A lift extender provides additional motion for moving the clutch assembly into or out of position. The tool replaces dangerous manual lifting of clutch assemblies and the use of heavy jacks. The tool's light weight and small size makes it easy to place into position underneath a heavy truck, and its short height eliminates the need for the extra jacking up of the truck previously required with jacks.

These and other embodiments of the present invention will become readily apparent upon further review of the following specification and associated drawings.

BRIEF DESCRIPTION OF THE DRAWINGS

The following embodiments of the present invention are described by way of example only, with reference to the accompanying drawings, in which.

DETAILED DESCRIPTION OF THE DRAWINGS

The following description of drawings is offered to illustrate the present invention clearly. However, it will be apparent to those skilled in the art that the concepts of the present invention are not limited to these specific details. Also, commonly known elements are shown in diagrams for clarity, as examples and not as limitations of the present invention.

Figure 1:
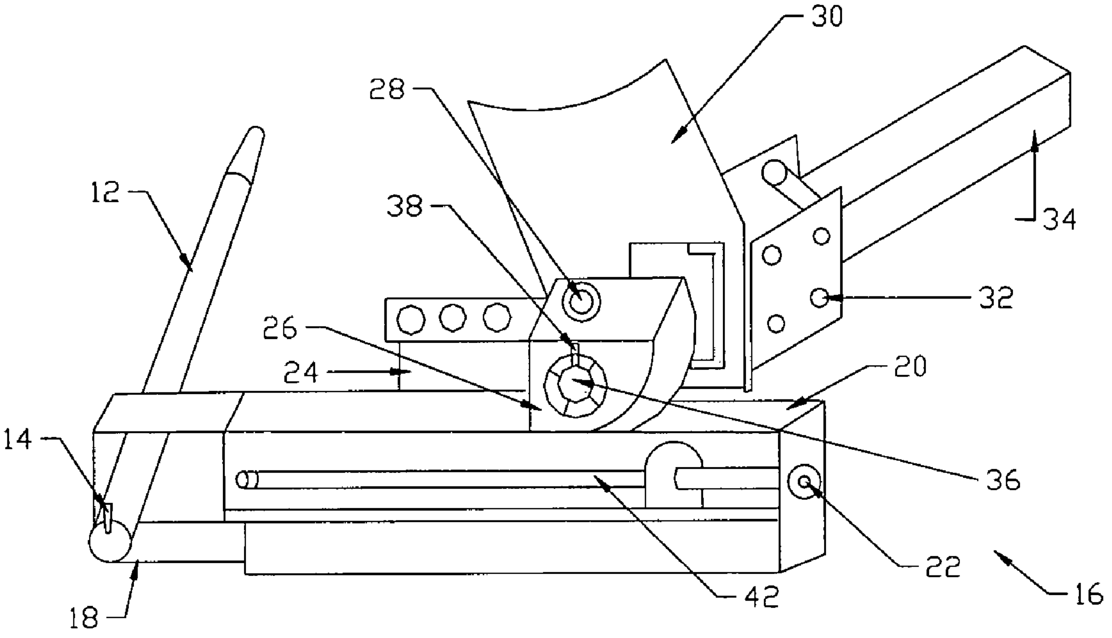
FIG. 1 illustrates a three quarters view of a Heavy Duty Clutch Installation and Removal Tool.

An embodiment of a Heavy Duty Clutch Installation and Removal Tool is shown in FIG. 1. It can be assembled or disassembled quickly and easily, and its parts are made of sturdy medal and can be easily replaced. When disassembled, it can be stored compactly.

The removable splined clutch shaft 12 provides support for a clutch assembly during installation or removal. In an embodiment, two different sizes of the removable splined clutch shaft 12 may be used for the two clutch assemblies of different sizes commonly used with heavy trucks. One has a diameter of 1½ inches, and the other 2 inches. In additional embodiments, other sizes of the removable splined clutch shaft 12 may be used, as appropriate for additional vehicles, or other machines, with other dimensions. A safety pin 14 attaches the removable splined clutch shaft 12 to a lift extender 16.

The lift extender 16 comprises an inner frame 18, an outer frame 20, a lift extender adjustment screw 22, a threaded shaft 42, and an adaptor plate 24.

A hole in one end of the inner frame 18 allows the insertion of the removable splined clutch shaft 12. A plate at the other end of the inner frame 18 fits over the threaded shaft 42. The inner frame 18 fits inside the outer frame 20 and can be moved in and out of the outer frame 20, forming a pick bar known to those skilled in the art.

The outer frame 20 is welded to the adaptor plate 24. A threaded shaft 42 fits through the outer frame 20. The bolt head on the threaded shaft 42 fits outside the outer frame 20 on a washer.

Turning the bolt head on the lift extender adjustment screw 22 turns the threaded shaft 42, which pushes against the plate on the inner frame 18 to move the inner frame 18 inside or outside of the outer frame 20. Note that in other embodiments other means, for example hydraulic means, may be used for moving the inner frame 18 inside or outside of the outer frame 20.

A slack adjuster 26 is bolted to the adaptor plate 24. An input shaft 36 with a squared body extends through the slack adjuster 26 and is held in place by an additional safety pin 38. The part of the input shaft 36 that is within the slack adjuster 26 comprises a round set of gear teeth. Turning the bolt head of the slack adjuster screw 28 on the slack adjuster 26 causes the slack adjuster screw 28 to move against the gear teeth on the input shaft 36, rotating the slack adjuster 26 about the axis of the input shaft 36. This motion thus rotates the lift extender 16 and the removable splined clutch shaft 12. Note that in other embodiments other means, for example hydraulic means, may be used for controlling rotation about the axis of the input shaft 36.

The squared end of the input shaft 36 may be pushed in and out through a squared position rail 34 that prevents the input shaft 36 from turning on its axis. A bearing bracket 32 is bolted into place over the position rail 34, so that the bearing bracket 32 is held firmly in place.

Figure 2:
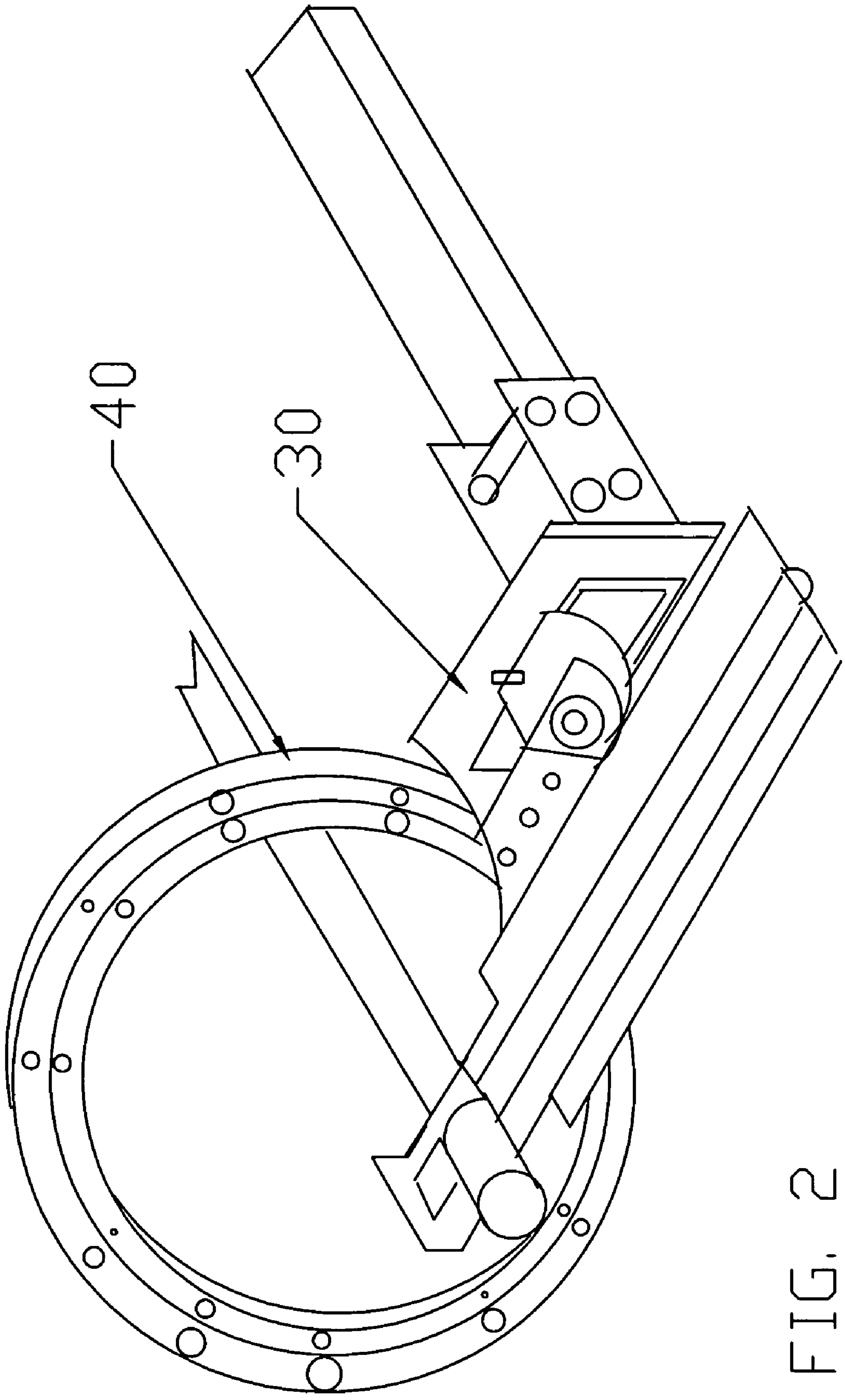
FIG. 2 illustrates a three quarters view of a Heavy Duty Clutch Installation and Removal Tool as it attaches to a flywheel housing.

A removable mounting bracket 30 fits securely over the bearing bracket 32. The mounting bracket 30 is bolted to the flywheel housing 40 of the truck to hold the tool in place and provide support for a clutch assembly, as shown in FIG. 2.

Use

To use the Heavy Duty Clutch Installation and Removal Tool for removing a clutch assembly, a mechanic removes the transmission from the truck's motor and moves the transmission back three to four feet. The mechanic bolts the correct mounting bracket 30 for the truck to the truck's flywheel housing 40, as shown in FIG. 2, and pushes or pulls manually against the lift extender 16, shown in FIG. 1, to slide the input shaft 36 and move the removable splined clutch shaft 12 into position so that it can be rotated.

Turning the slack adjuster screw 28 with a wrench or impact gun allows the mechanic to rotate the removable splined clutch shaft 12 to approximately the correct height for insertion into the hole in the clutch assembly. Turning the lift extender adjustment screw 22 with a wrench or impact gun moves the removable splined clutch shaft 12 closer to or farther away from the hole in the clutch assembly along the line of the lift extender 16. If necessary, further adjustments of the slack adjuster screw 28 and the lift extender adjustment screw 22 may be made until the removable splined clutch shaft 12 is in the correct position. The mechanic then pushes the lift extender 16 to move the removable splined clutch shaft 12 into the hole of the clutch assembly and pulls the clutch assembly and the removable splined clutch shaft 12 out, extending the input shaft 36.

The Heavy Duty Clutch Installation and Removal Tool supports the weight of the clutch assembly fully, so that the mechanic does not have to manually. To lower the clutch assembly to the ground, the mechanic again turns the slack adjuster screw 28 with a wrench or impact gun and, if necessary, the lift extender adjustment screw 22 with a wrench or impact gun as well, to achieve the proper positioning of the clutch assembly. After the clutch assembly is on the ground, it can be slid away manually. Or it may be lowered onto a small cart or caddy and wheeled away.

To install another clutch assembly, the mechanic slides the clutch assembly under the truck, or places it on a small cart or caddy and wheels it under. The mechanic places the removable splined clutch shaft 12 through the hole in the clutch assembly and uses the mechanical controls on the Heavy Duty Clutch Installation and Removal Tool to move the clutch assembly into place. The mechanic can then bolt the clutch assembly into place with alignment studs.

For example, the Heavy Duty Clutch Installation and Removal Tool may be used as described above to remove and install any 14 inch or 15½ inch automotive pull-type clutch assembly.

Note that the Heavy Duty Clutch Installation and Removal Tool lowers and lifts clutch assemblies mechanically, without the mechanic having to do this strenuous and potentially dangerous work. The Heavy Duty Clutch Installation and Removal Tool can be quickly employed, without requiring the time involved for the truck to be raised higher to accommodate a heavy jack, and its lightweight and compact design make it inexpensive compared to a heavy jack. Moreover the controls on the Heavy Duty Clutch Installation and Removal Tool allow the mechanic to quickly lower and raise clutch assemblies with precision, making it comparatively safer and more efficient than other methods.

Further note that the Heavy Duty Clutch Installation and Removal Tool may be used to remove and install other engine components besides clutch assemblies. For example, it may be used to remove and install flywheels.

The best dimensional relationships for the parts of the invention described above, including variations in form and use, will be readily apparent to those skilled in the art, and are intended to be encompassed by the present invention.

What is claimed is:

1. A clutch tool for the installation and removal of clutch components and other engine components in a flywheel housing comprising, a mounting bracket is removably mountable to the flywheel housing having a plurality of aperture, the mounting bracket having a front surface;

a back surface; wherein the front and back surfaces having apertures in alignment with the apertures on the flywheel housing, wherein fastening members may be used to fasten the mounting bracket to the flywheel housing; and at least one splined clutch shaft capable of being inserted into the hole on the clutch assembly;

an input shaft having a square body, and capable of moving the splined clutch shaft;

a lift extender having a lift extender screw capable of moving the splined clutch shaft;

a bearing bracket which is bolted over a position rail; and a position rail capable of preventing the input shaft from turning on its axis.

2. The clutch tool of claim 1, further comprising a slack adjuster having a slack adjuster screw that when rotated causes the slack adjuster to rotate about the axis of the input shaft which extends through the slack adjuster.

3. The clutch tool of claim 1, wherein the mounting bracket is securely fastened over the bearing bracket and bolted to the flywheel housing thereby holding the apparatus in place.

4. The clutch tool of claim 1, wherein the splined clutch shaft comprises a plurality of splined clutch shafts designed to fit within a plurality of clutch assemblies; and an aperture in one end, wherein a fastening member may be inserted to fasten the splined clutch shaft to the lift extender.

5. The fastening member of claim 4 wherein the fastening member comprises a safety pin.

6. The clutch tool of claim 1 wherein the input shaft comprises a round section with geared teeth;

an aperture on one end, wherein the fastening member may be used to fasten the input shaft to the lift extender; and a squared section attached to the round section, wherein the squared section is moveable through a squared position rail.

7. The fastening member of claim 6, wherein the fastening member comprises a safety pin.

8. The clutch tool of claim 1, wherein the lift extender comprises an inner frame, wherein the inner frame is moveable through an outer frame;

an outer frame, wherein the outer frame is attached fixedly to an adaptor plate;

an adaptor plate that is removably mounted to the slack adjuster, the adaptor plate having apertures in alignment with the apertures on the slack adjuster, wherein fastening members may be used to fasten the adaptor plate to the slack adjuster;

an aperture in the outer frame, wherein an attaching member on the splined clutch shaft may be inserted to attach the splined clutch shaft to the slack adjuster; and means, for moving the inner frame inside or outside of the outer frame.

9. The means for moving the inner frame inside or outside of the outer frame of claim 8, further comprising a plate attached fixedly to the inner frame, wherein the plate contains an aperture through which a threaded shaft may be turned;

a threaded shaft, wherein the threaded shaft may be turned through the plate to move the inner frame; and a lift extender adjustment screw that extends through the outer frame, wherein the lift extender adjustment screw may be turned thereby turning the threaded shaft.

10. The clutch tool of claim 1, further comprising a means for controlling rotation of the apparatus about the axis of the input shaft comprising a slack adjuster, wherein the slack adjuster comprises a section with an aperture through which an input shaft may be inserted; a section with apertures in alignment with the apertures on the adaptor plate; and a slack adjuster screw having teeth that engage the gear teeth on the input shaft to turn the slack adjuster rotationally about the axis of the input shaft.

11. The clutch tool of claim 1, wherein the position rail has an aperture through which the squared section of the input shaft may be moved; thereby preventing the input shaft from turning on its axis.

12. An apparatus for the installation and removal of clutch components in a flywheel housing, the flywheel housing having a plurality of apertures for receiving fastening members, the apparatus comprising elements that are removably mounted to the apparatus, the elements comprising a mounting bracket that is removably mountable to the flywheel housing, the mounting bracket having a front surface;

a back surface;

apertures in alignment with the apertures on the flywheel housing, wherein fastening members may be used to fasten the mounting bracket to the flywheel housing; and an aperture through which a bearing bracket may be inserted; a plurality of splined clutch shafts, designed to fit within a plurality of clutch assemblies; and an aperture in one end of the splined clutch shafts, wherein a safety pin may be inserted to fasten the splined clutch shaft to a lift extender and capable of being aligned with an opening in the clutch components;

an input shaft, wherein the input shaft comprises a round section with geared teeth;

an aperture on one end, wherein a safety pin may be used to fasten the input shaft to a lift extenderand a squared section attached to the round section, wherein the squared section is movable through a squared position rail;

a lift extender, wherein the lift extender comprises an inner frame, wherein the inner frame is moveable through an outer frame;

an outer frame, wherein the outer frame is attached fixedly to an adaptor plate;

an adaptor plate that is removably mounted to a slack adjuster, the adaptor plate having apertures in alignment with the apertures of the slack adjuster, wherein fastening members may be used to fasten the adaptor plate the slack adjuster;

an aperture in the outer frame, wherein an attaching member on a splined clutch shaft may be inserted to attach the splined clutch shaft to the slack adjuster;

a plate attached fixedly to the inner frame, wherein the plate contains an aperture through which a threaded shaft may be turned;

a threaded shaft, wherein the threaded shaft may be turned through the plate to move the inner frame within the outer frame;

a lift extender adjustment screw that extends through a place on the outer frame, wherein the lift extender adjustment screw may be turned to turn the threaded shaft;

a slack adjuster, wherein the slack adjuster comprises a section with an aperture through which an input shaft may be inserted;

a section with apertures in alignment with the apertures on an adaptor plate; and a slack adjuster screw, the slack adjuster screw having teeth that engage with the gear teeth on the input shaft to turn the slack adjuster rotationally about the axis on the input shaft;

a bearing bracket, wherein the bearing bracket is removably mountable to a position rail; and a position rail, wherein the position rail having an aperture through which the squared section of an input shaft may be moved.

13. The mounting bracket of claim 12, further comprising a plurality of apertures in alignment with the apertures on the flywheel housings on a plurality of vehicles.

* * * * *